United States Patent [19]

Lamond et al.

[11] 4,246,220
[45] * Jan. 20, 1981

[54] PROCESS FOR PRODUCING PELLETIZED KAOLIN CLAY

[75] Inventors: Trevor G. Lamond; Charles R. Cuthbertson, both of Borger, Tex.

[73] Assignee: J. M. Huber Corporation, Locust, N.J.

[*] Notice: The portion of the term of this patent subsequent to Jun. 26, 1996, has been disclaimed.

[21] Appl. No.: 51,093

[22] Filed: Jun. 22, 1979

[51] Int. Cl.³ .............................................. B01J 2/12
[52] U.S. Cl. ................................................. 264/117
[58] Field of Search ............................. 264/117, 115

[56] References Cited

U.S. PATENT DOCUMENTS

| | | | |
|---|---|---|---|
| 3,277,218 | 10/1966 | Dollinger | 264/117 |
| 3,406,426 | 10/1968 | Probst, Jr. et al. | 264/117 |
| 3,528,785 | 9/1970 | Dingus | 264/117 |
| 4,159,296 | 6/1979 | Florea et al. | 264/117 |

*Primary Examiner*—Donald E. Czaja
*Assistant Examiner*—James R. Hall
*Attorney, Agent, or Firm*—Ernest A. Schaal; Harold H. Flanders

[57] ABSTRACT

A process for making densified kaolin clay pellets of high bulk density, good handling and bulk flow properties, and low moisture content is disclosed. The process consists essentially of mixing substantially dry kaolin clay with steam to bring the total moisture content of the finely divided kaolin clay to from about 17% to about 26% by weight based on the weight of said dry kaolin clay during mixing in a roller mixer, followed by screening, and subsequent pelletization in a roller while drying. The pellets are dried to 1% or less moisture content by weight based on the weight of dry kaolin clay.

1 Claim, 1 Drawing Figure

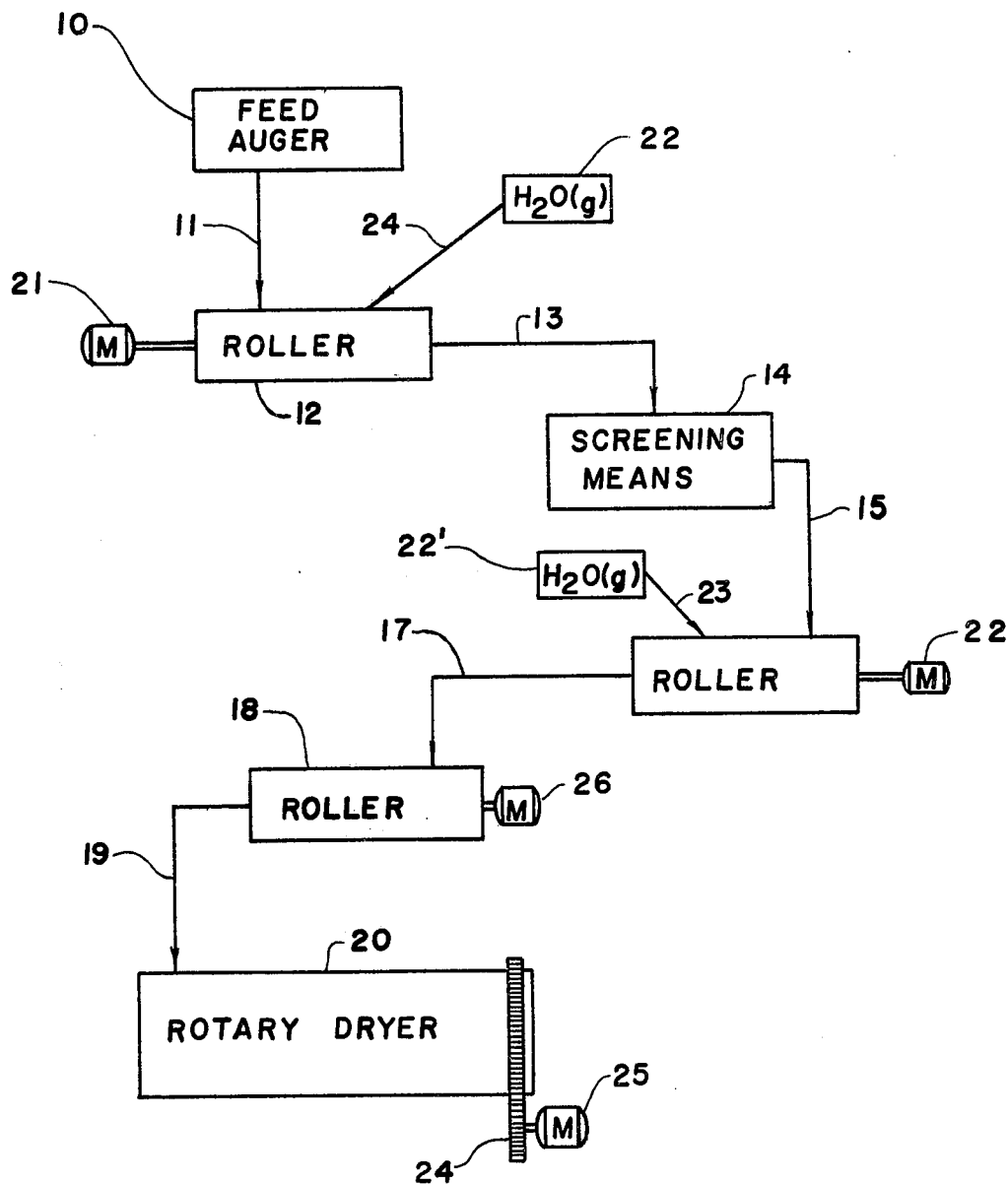

PROCESS FOR PRODUCING PELLETIZED KAOLIN CLAY

BACKGROUND OF THE INVENTION

In general, the present invention relates to the pelletization of kaolin clay.

The prior art has repeatedly addressed the problem of producing kaolin clay pellets of suitable hardness and durability with high bulk density, good handling and bulk flow properties and low moisture content. Heretofore, the results obtained have not been entirely satisfactory.

SUMMARY OF THE INVENTION

Accordingly, it is an object of this invention to provide a new, highly effective method which overcomes the deficiencies of the prior art.

It is a further object of the present invention to provide a new process for densifying kaolin clay.

Another object of the present invention is to produce kaolin clay pellets of high bulk density.

Still another object of the present invention is to produce kaolin clay pellets having good handling and bulk flow properties.

Another object of the present invention is to produce a better kaolin clay pellet.

An additional object of the present invention is to produce a pellet size distribution in a desirable, narrow range.

A further object of the present invention is to produce a hard, durable pellet of kaolin clay having a low moisture content.

Other objects and a further understanding of the present invention may be had by referring to the following description and claims taken in conjunction with the accompanying drawing.

The present invention overcomes the deficiencies of the prior art and achieves its objectives by mixing substantially dry kaolin clay in a roller mixer with an added quantity of water supplied in the form of a fine spray of steam in amount sufficient to bring the total moisture content of the finely divided kaolin clay to from about 17% to about 26% by weight based on the weight of dry kaolin clay. After such mixing in a pin mixer, the kaolin clay is screened. Following screening, the kaolin clay is further pelletized in a second roller and dried to 1% or less moisture content on a weight basis based on the weight of dry kaolin clay.

BRIEF DESCRIPTION OF THE DRAWING

In order to facilitate the understanding of the present invention, reference will now be made to the appended drawing of a preferred embodiment of the present invention. The drawing should not be construed as limiting the invention, but is exemplary only. The drawing is a block schematic diagram of the process of the preferred embodiment of the present invention.

DESCRIPTION OF THE PREFERRED EMBODIMENTS

A preferred embodiment of the present invention is shown in the appended drawing. A substantially constant supply of substantially dry kaolin clay is passed by feed auger 10 into roller 12 by line 11. The substantially dry kaolin clay is mixed in roller 12 with water which is added by a spray 24 in the form of a fine spray or mist of steam. Steam is supplied to spray 24 from a suitable supply source 22. Spray 24 serves to provide a fine spray or mist of steam directly into and within the working chamber of roller 12 where the kaolin clay is being worked and mixed. Roller 12 is operated in a conventional manner by motor 21.

The wetted kaolin clay is then passed from roller 12 into screening means 14 where it is worked and forced through a 10-mesh screen.

Following screening in screening means 14, the kaolin clay is then passed by line 15 to second roller 16 where it is further pelletized. Roller 16 is operated in a conventional manner by motor 22.

The pellets formed in roller 16 may then be passed by line 17 to a third roller 18 for further pelletization and polishing. The third roller 18 is operated in a conventional manner by motor 26.

In normal operation, sufficient steam for the process is added to roller 12 to wet the clay. However, in optional embodiments, additional steam may be added to roller 16 via line 23 if necessary from source 22'.

It will be understood that third roller 18 is an optional embodiment in further pelletizing and polishing the pellets.

Upon passing from roller 18, the pellets of kaolin clay are then passed by line 19 into a rotary dryer 20 which drys the pellets to a moisture content of 1% or less by weight based on the weight of the dry clay to provide the final product which upon passing from rotary dryer 20 may be conveyed to storage or to shipping. Operation of the rotary dryer 20 is effected by gear means 24 driven by motor 25.

While steam is referred to throughout as the preferred embodiment of the wetting agent, other suitable liquids or fluids may be used alone or in conjunction with water. Other such typical wetting agents include water, a water-oil emulsion, a water-based solution of a molasses-type binder, organic or oleaginous liquids and combinations of the same with each other and with water. The water may be at ambient temperature or heated.

The amount of steam added in roller 12 is an amount sufficient to bring the total moisture content of the kaolin clay to from about 17% to about 26%, preferably from about 21% to about 25%, more preferably from about 22.5% to about 25%, and most preferably about 23%, all percentages by weight based on the weight of the dry kaolin clay.

While any suitable rollers and roller mixers may be employed, pin mixers such as described in U.S. Pat. No. 3,528,785 may also be employed in conjunction with such rollers.

Roller 12 is 14 feet long and has a 13 inch width. With a 7.5 horsepower motor, roller 12 may be operated from 80 to 150 revolutions per minute. Typically 80 revolutions per minute are preferred.

Screening means 14 may be a No. 4 "Mikro-Pulverizer" manufactured by MikroPul Corporation which may be operated at 1090 revolutions per minute and at 6163 feet per minute tip speed with a 30 horsepower motor. Alternatively, screening means 14 may be a No. 2 SCB Model manufactured by Pulverizing Machinery Company also driven with a 30 horsepower motor. In many cases, the screening means 14 may consist of a 10-mesh screen with suitable conventional means provided to force the wet pellets through the 10-mesh screen.

Roller 16 is 10 feet long and 13 inches wide. With a 5 horsepower motor, roller 16 may be operated from 80 to 150 revolutions per minute, with 116 revolutions per minute preferred. The roller 16 may if desired be heated to begin slow drying of the pellets.

Rotary dryer 20 is direct fired rotary dryer manufactured by the Hardinge Company. Rotary dryer 20 is 45 feet long with a 6 foot diameter. Rotary dryer 20 is operated at 2 revolutions per minute and has a 3 inch lift on a 45° angle in the last 25 feet of its 45 foot length.

Conventional feed augers, screw augers, conveying belts and the like are employed in passing the kaolin clay to and from each of the elements of equipment recited above in the process of the present invention.

Spray nozzle 24 may be a Beta Fog Nozzle or other suitable steam spray nozzle to spray a fine mist or fog of steam onto the kaolin clay.

To further facilitate the understanding of the present invention, reference will now be made to the following examples which should not be construed as limiting the invention but are exemplary only.

EXAMPLE I

An East Georgia air-floated clay was placed in a roller and its moisture content increased to 19.8% by weight based on the weight of the dry clay by a spray of steam. The rough pellets thus formed were forced through a 10-mesh screen and the resulting pellets placed in a roller and dried. The pellet properties are shown in Table I.

EXAMPLE II

A mercapto-silane surface modified clay was placed in a roller and its moisture content increased to 19.4% by weight based on the weight of the dry clay by a spray of steam. The rough pellets thus formed were forced through a 10-mesh screen and the resulting pellets placed in a roller and dried. The pellet properties are shown in Table I.

EXAMPLE III

A mercapto-silane surface modified clay was placed in a roller and its moisture content increased to 21.1% by weight based on the weight of the dry clay by a spray of steam. The rough pellets thus formed were forced through a 10-mesh screen and the resulting pellets placed in a roller and dried. The pellet properties are shown in Table I.

TABLE I

| Example No.: | | I | II | III |
|---|---|---|---|---|
| Pour Density, lbs/ft$^3$ | | 50.1 | 47.6 | 48.8 |
| Pellet Hardness, grams (#14 mesh) | High | 100 | 39 | 35 |
| | Avg. | 56 | 21 | 24 |
| | Low | 27 | 12 | 10 |
| Fines, %, 20 min., 120 mesh | | 28.6 | 13.2 | 12.4 |

EXAMPLES IV, V, AND VI

The pellets of Examples I, II, and III were incorporated into a Natsyn 400 rubber hydrocarbon compound (RHC) having the following batch composition and by the following procedure:

| Mill Mix Batch | Parts/100 RHC |
|---|---|
| Natsyn 400 | 100.00 |
| Zinc Oxide | 5.00 |
| Stearic Acid | 2.00 |
| Clay | 75.00 |
| Sulfur | 2.75 |
| Agerite White | 1.00 |
| Amax | 1.25 |
| Methyl Tuads | 0.20 |
| Total | 187.20 |
| Specific Gravity = 1.29 | |
| Batch Factor = 5.0 | |
| Mill Batch | Grams |
| Natsyn 400 | 500.0 |
| Zinc Oxide | 25.0 |
| Stearic Acid | 10.0 |
| Clay | 375.0 |
| Agerite White | 5.0 |
| Total | 915.0 |
| Mill Mixing Operation and Procedure | |
| Starting temperature 120° F. | |
| Minutes | Procedure |
| 0 | Band Rubber. |
| 2 | Add Stearic Acid. |
| 4 | Add Clay, Zinc Oxide and Agerite White. |
| 10 | Cut six times. |
| 13 | Remove and cool 1 hour. |
| Final Mill Batch | Grams |
| Masterbatch | 915.00 |
| Sulfur | 13.75 |
| Amax | 6.25 |
| Methyl Tuads | 1.00 |
| Total | 936.00 |
| Add accelerator and sulfur on 120° F. mill. | |

Designating the rubber property test of the pellets of Example I as Example IV, those of Examples II as Example V, and those of Example III as Example VI, the following test results were obtained:

| | | Example IV | | Example V | | Example VI | |
|---|---|---|---|---|---|---|---|
| | | 100% | 300% | 100% | 300% | 100% | 300% |
| Modulus (293° F. Cure) (psi) | 10 min. | 350 | 930 | 490 | 1720 | 450 | 1510 |
| | 15 min. | 360 | 960 | 490 | 1660 | 460 | 1600 |
| Tensile (psi @ 300%) | 10 min. | | 3760 | | 4070 | | 3930 |
| | 15 min. | | 3520 | | 3580 | | 3830 |
| Elongation (%) | 10 min. | | 640 | | 560 | | 560 |
| | 15 min. | | 610 | | 520 | | 550 |
| Hardness (Shore A$_2$) | 10 min. | | 57 | | 58 | | 58 |
| | 15 min. | | 58 | | 58 | | 58 |
| Compression (Set B - 22 hr. | | | | | | | |

-continued

| | | Example IV | | Example V | | Example VI | |
|---|---|---|---|---|---|---|---|
| | | 100% | 300% | 100% | 300% | 100% | 300% |
| 158° F., 30 min. @ 293° F.) (%) | | | 29.9 | | 13.5 | | 15.0 |
| Flexometer (30" @ 293° F.), (°F.) | | | 154 | | 141 | | 144 |
| Tear (Die C) | | | | | | | |
| (psi) | 10 min. | | 200 | | 230 | | 235 |
| | 15 min. | | 200 | | 200 | | 235 |
| Dispersion, % | | | 94 | | 98 | | 95 |

The pellets were observed to have the desired degree of hardness and good flow and bulk handling characteristics. The pellet hardness of the pelletized kaolin clay was found to be from about 20 grams to about 110 grams. The bulk density of the pelletized kaolin clay was found to be from about 45 pounds per cubic foot to about 63 pounds per cubic foot as compared to a bulk density for pulverized kaolin clay of from 40 to 45 pounds per cubic foot. The rubber dispersion in synthetic rubber of the pelletized kaolin clay was found to be from about 84% dispersion to 99% dispersion as compared to 88% dispersion for a typical pulverized clay.

In operation, a substantially dry, finely divided kaolin clay is mixed in roller means while adding sufficient steam to bring the total moisture content of the finely divided kaolin clay to from about 17% to about 26% by weight based on the weight of the dry kaolin. The kaolin clay is then screened and further pelletized in a second roller means. The pelletized clay is dried in a rotary dryer to 1% or less moisture content by weight based on the weight of the dry clay.

While the present invention has been described with reference to specific embodiments, the present application is intended to cover those various changes and substitutions which may be made by those skilled in the art without departing from the spirit and scope of the appended claims.

We claim:

1. A process for making densified kaolin clay pellets of high bulk density, good handling and bulk flow properties, and low moisture content consisting essentially of:
 (a) providing a substantially dry, finely divided kaolin clay to be pelletized to be fed to a roller means;
 (b) feeding said substantially dry, finely divided kaolin clay to said roller means;
 (c) mixing said kaolin clay in said roller means;
 (d) adding a quantity of water in the form of a fine spray of steam to the substantially dry, finely divided kaolin clay in an amount sufficient to bring the total moisture content of the finely divided kaolin clay to from about 17% to about 26% by weight based on the weight of said dry kaolin clay during mixing in said roller means and working said moistened kaolin clay in said roller means;
 (e) passing said kaolin clay from said roller means onto screening means;
 (f) screening said kaolin clay in said screening means to establish the pellet size;
 (g) passing said kaolin clay from said screening means into a second roller means for forming densified pellets of said screened kaolin clay and forming pellets of said screened kaolin clay therein and further pelletizing and polishing said kaolin clay in said second roller means;
 (h) passing said pelletized kaolin clay from said second roller means into a rotary dryer means for drying said pellets; and
 (i) drying said pellets to a moisture content of less than about 1% by weight based on the weight of said dry kaolin clay.

* * * * *